Jan. 9, 1923.
V. W. PAGÉ.
MULTIPLE DISK BRAKE.
FILED APR. 5, 1921.

WITNESSES
Thomas Reichert
P. H. Pattison

INVENTOR
VICTOR W. PAGÉ
BY Munn & Co.
ATTORNEYS

Patented Jan. 9, 1923.

1,441,943

UNITED STATES PATENT OFFICE.

VICTOR W. PAGÉ, OF NEW YORK, N. Y.

MULTIPLE-DISK BRAKE.

Application filed April 5, 1921. Serial No. 458,656.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Multiple-Disk Brake, of which the following is a full, clear, and exact description.

The present invention relates to new and useful improvements in brakes, and it pertains more particularly to brakes for motor vehicles.

It is one of the objects of the invention to provide a brake which is adapted to exert a braking action upon the driving mechanism of a vehicle.

It is a further object of the invention to provide a brake which exerts its braking action upon the driving shaft of the vehicle.

It is a further object of the invention to construct a brake of a plurality of plates adapted to be moved into engagement with one another to provide the necessary friction to provide the braking action.

It is a further object of the invention to confine the brake within a housing and to so construct said housing that it is readily carried by the rear wall of the transmission housing upon the exterior thereof.

It is a further object of the invention to so construct the housing of the brake that the rear wall thereof forms a portion of the universal joint housing.

It is a still further object of the invention to construct a brake of the above-described type in such a manner that it will be compact and may therefore be positioned on the power shaft between the transmission and the universal joint.

With the above and other objects in view, reference is had to the accompanying drawings in which—

Figure 1:
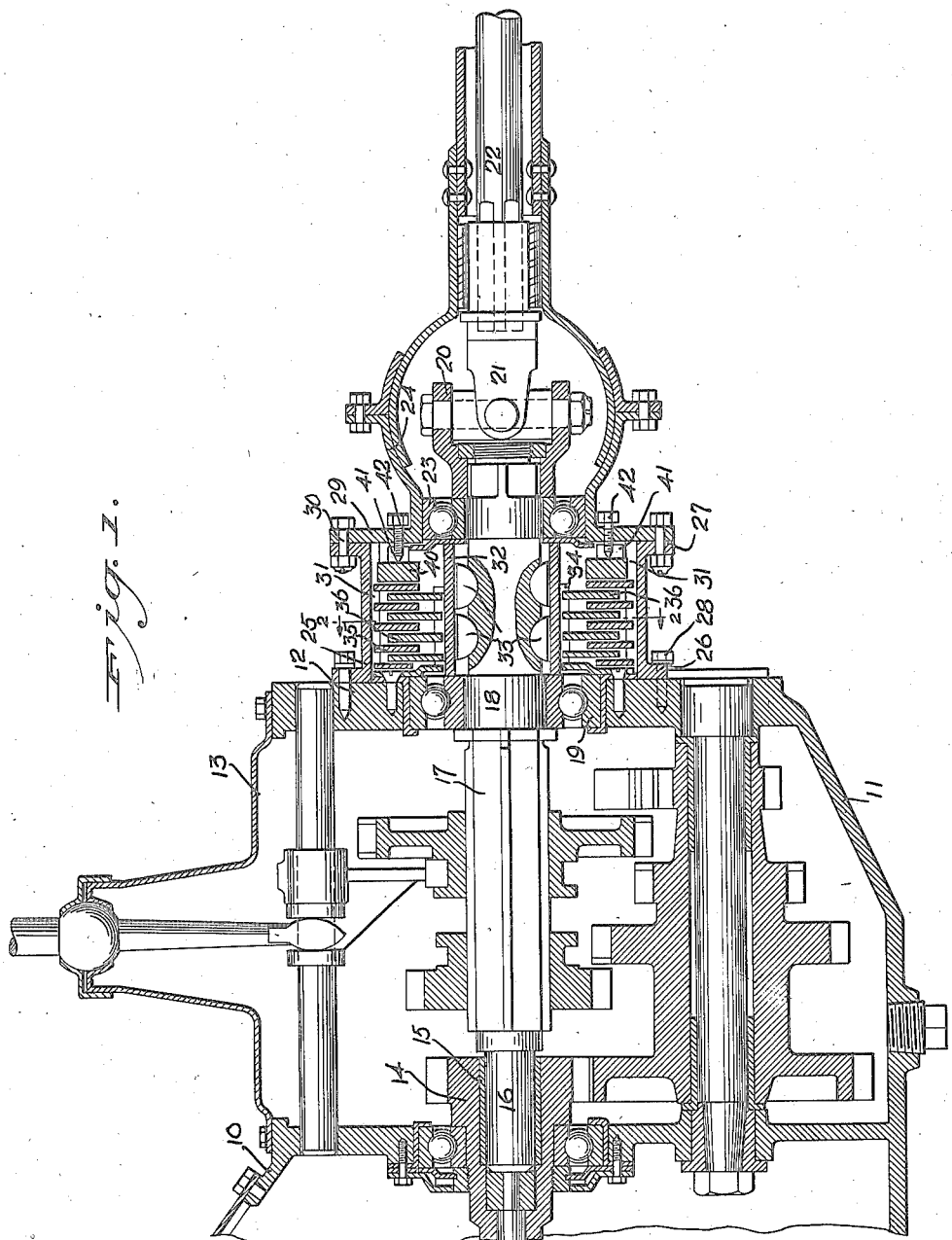
Figure 1 is a longitudinal sectional view of a transmission mechanism, a brake, a universal joint, and a portion of the propeller shaft and its housing, showing a brake constructed in accordance with the present invention in section and illustrating its position as regards the remainder of the mechanism.

Referring more particularly to the drawings, the reference character 10 designates the rear end of the motor crank case or clutch housing and said rear end is formed with an integral extension 11 having a rear wall 12 and suitable side walls to provide a transmission box or housing. This transmission box or housing has its top wall closed by means of a plate or other suitable closure 13, as is the common practice.

Figure 2:
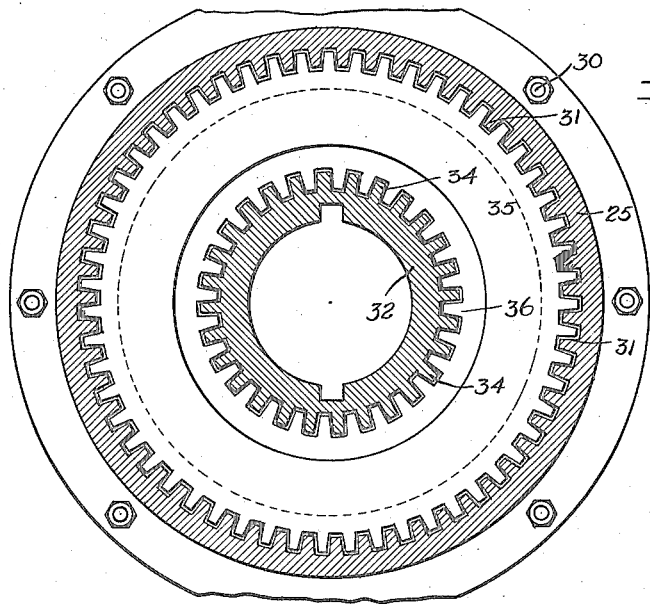
Fig. 2 is a detail sectional view of a portion of the brake.

The reference character 14 designates the driving element of the transmission mechanism, and said driving element is socketed, as at 15, to receive the forward end 16 of the main shaft 17 of the transmission mechanism, said main shaft 17 being extended through the rear wall 12 of the transmission housing as indicated by the reference character 18. The rear end of this main shaft 17 is mounted in roller bearings 19, where it extends through the rear wall 12 of the transmission housing, and the main shaft 17 is provided upon its rear extremity with one member 20 of a universal joint, the other member 21 being carried by the propeller shaft 22. The reference character 23 designates a roller bearing adjacent the rear extremity of the main driving shaft 17 and said roller bearing 23 is mounted in the forward half 24 of the universal joint housing. The reference character 25 designates the brake housing, and said brake housing is preferably cylindrical in form and has its edges defined by means of flanges 26 and 27. Passing through the flange 26 is a plurality of bolts 28, by means of which the brake housing 25 is secured to the rear wall of the transmission housing. The forward half 24 of the universal joint housing is provided with an annular flange 29, and said annular flange 29 has a plurality of bolts 30 passing therethrough, which bolts also pass through perforations in the rear flange 27. By this construction it is apparent that the rear wall 12 of the transmission housing forms the front wall of the brake housing 25, and a flange 29 carried by the forward half 24 of the universal joint housing forms the rear wall of the brake housing 25. As more clearly shown in Fig. 2, the brake housing 25 is provided upon its inner surface with a plurality of spaced lugs 31, the purpose of which lugs will be hereinafter more specifically defined.

Mounted upon the main driving shaft 17 of the transmission at a point between the roller bearings 19 and 23, is a sleeve 32. This sleeve 32 is secured to the main driving shaft 17 in such a manner as to rotate therewith by means of keys 33. This sleeve 32 is provided upon its exterior surface with a plurality of spaced lugs 34, this construction being more clearly shown in Fig. 2.

The reference character 35 designates a plurality of circular plates or rings, and said circular plates or rings are notched to receive the lugs 31 formed upon the inner surface of the brake housing 25. By this construction it is apparent that the several plates or rings 35 are retained against rotation relative to the driving shaft 17 and the brake housing 25.

Figure 3:
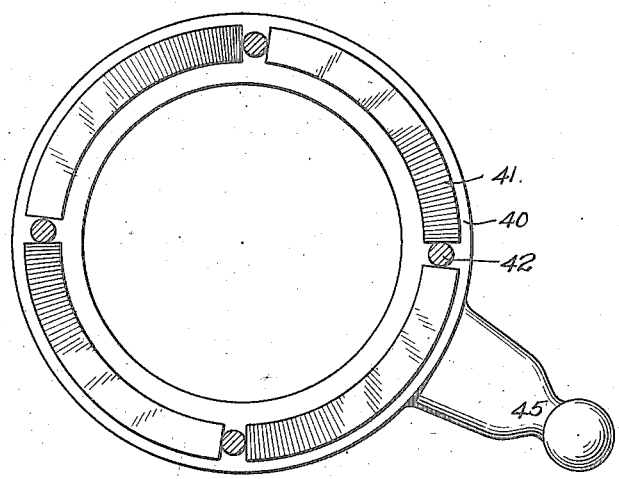
Fig. 3 is a detail elevational view partly in section of the brake-operating mechanism.
Figure 4:
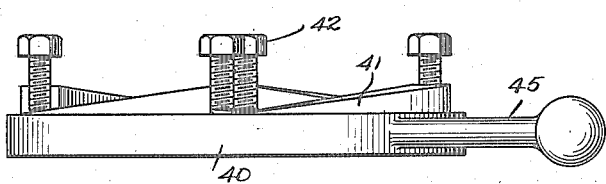
Fig. 4 is an edge view of the operating mechanism.

The reference character 36 designates a plurality of plates, the center opening of which is of a size slightly greater than the diameter of the sleeve 32, and said plates 36 are notched in their central opening in such a manner as to receive the several lugs 34 formed upon the sleeve 32. By this construction it is apparent that inasmuch as the sleeve 32 is keyed to the shaft 17 by means of the keys 33, the plates 36 which are interposed with respect to the plates 35 are free to rotate between the plates 35 under normal conditions. To provide for moving the plates into engagement with each other, a ring 40 is employed and said ring is mounted at the rear end of the brake housing 25, as more clearly shown in Fig. 1. As more clearly shown in Figs. 3 and 4, this ring 40 is provided with a plurality of cam surfaces 41, and said cam surfaces 41 are adapted to engage with cap screws or the like 42 upon rotation of the ring 40, to force the same forwardly and to cause a compression of the several plates 35 and 36, it being understood that said plates are slidably mounted with relation to their respective members, i. e., the brake housing 25 and the sleeve 32.

To provide for rotating the ring 40, the same is furnished with an arm 45 to which a suitable operating mechanism, not forming a particular part of the present invention, is connected in such a manner that as said mechanism is operated, the ring 40 will be rotated in the brake housing 25, and owing to the engagement of the cap screws 42 with the cam surfaces 41, said ring will be forced forwardly of the brake housing 25. By an adjustment of the cap screws 42, it will be apparent that the extent of the forward movement of the ring 40 may be determined.

The device operates in the following manner:

With the several parts in operative position, when it is desired to apply the brake, the mechanism is operated to rock the ring 40 in such a manner that the cap screws 42 will ride upon the cam surfaces 41 and force the ring 40 forwardly of the brake housing 25. This movement of the ring 40 moves the non-rotating plates 35 into engagement with the rotating plates 36. This engagement of the non-rotating plates with the rotating plates provides a friction or a braking action which will retard the motion of the main driving shaft 17.

Upon release of the braking action, the ring 40 will return to normal position under the influence of the braking torque which is that shown in Fig. 1, and permit of a sliding or a movement of the rotating plates 36 relative to the non-rotating plates 35.

By this construction, it is apparent that if the vehicle were coasting with the elements of the transmission mechanism in "neutral" position, a braking action could be had by an operation of the brake since with the parts in this position, the main driving shaft 17 would be in rotation owing to the action of the rear wheels of the vehicle.

I claim—

1. In combination with the main power shaft of a motor-driven vehicle and the transmission mechanism and its housing thereof, a housing rigidly carried by the housing of said transmission mechanism on the rear wall thereof, a plurality of non-rotating plates slidably mounted in the second-mentioned housing, a plurality of rotating plates slidably mounted upon the main power shaft of the driving mechanism, and means for sliding said plates to a point where they will be in engagement one with another to produce a retarding action upon the main shaft of the driving mechanism.

2. In combination with a transmision housing, and a universal joint housing, a brake interposed between said housings, and a housing for said brake, said brake housing being supported from one of the walls of the transmission housing and secured to the universal joint housing.

3. In combination with a transmission housing and a universal joint housing, a brake interposed between said housings, a brake housing interposed between said transmission housing and universal joint housing, the transmission housing forming one of the walls of the brake housing and the universal joint housing being provided with an annular flange forming one of the other walls of the brake housing.

4. In combination with a transmission housing, a brake housing secured thereto in such a manner that one of the walls of the transmission housing forms one of the walls of the brake housing, a universal joint housing and an annular flange formed on said universal joint housing and adapted to be secured to the brake housing in such a manner that said annular flange forms one of the walls of the brake housing.

5. In a motor vehicle power line, a transmission mechanism, a housing therefor, a brake mechanism, and a housing for said brake mechanism, said brake mechanism housing being rigidly carried by the transmission housing.

6. In combination with a transmission mechanism, a housing therefor, a brake and a housing for said brake, said brake housing being rigidly carried by the rear wall of the transmission housing.

7. In combination with a transmission mechanism, a brake and a housing for said brake, said housing having one of its ends open and secured to the transmission mechanism in such a manner that the rear wall thereof forms means for closing the open end of the brake housing.

VICTOR W. PAGÉ.